UNITED STATES PATENT OFFICE.

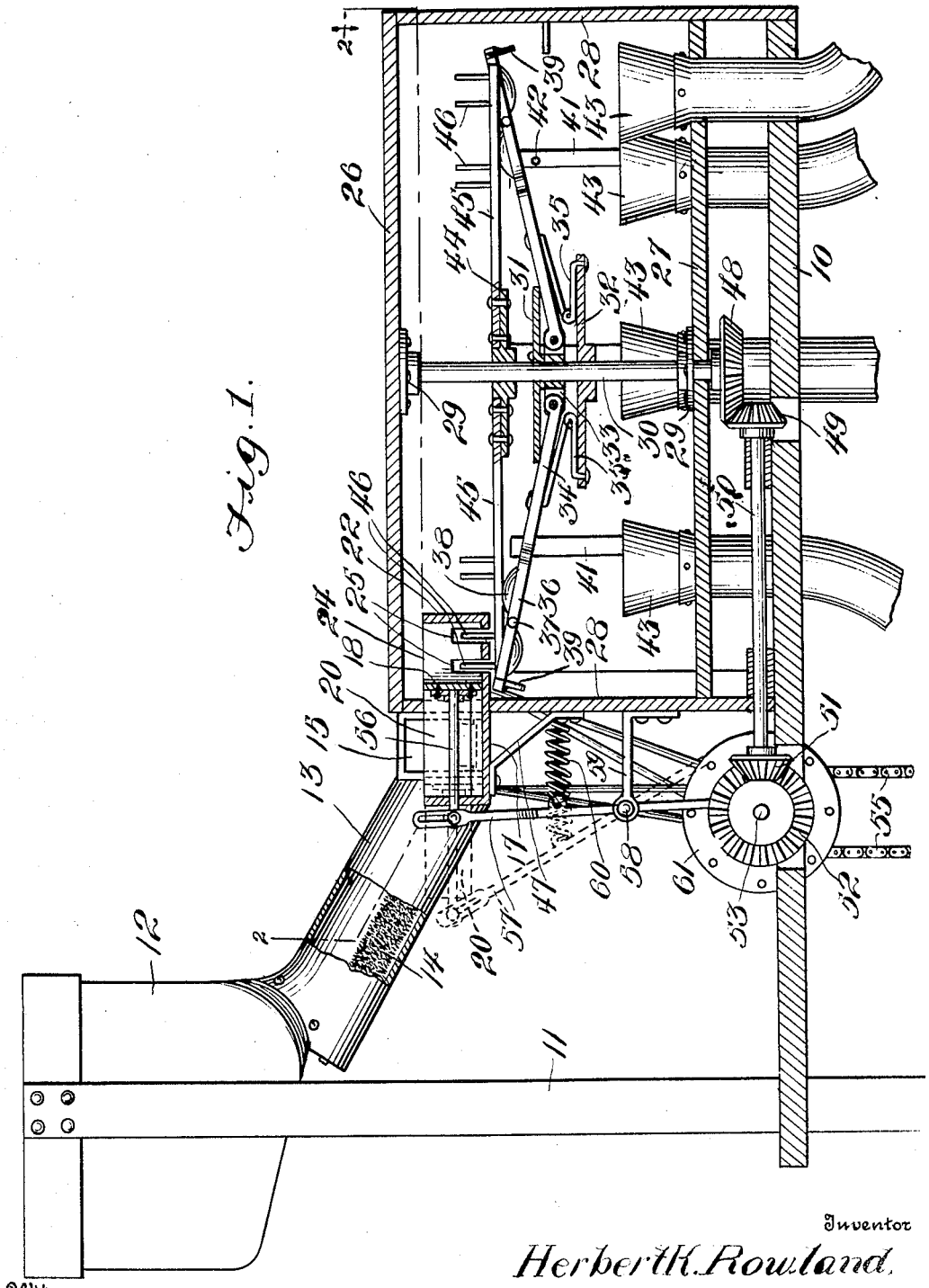

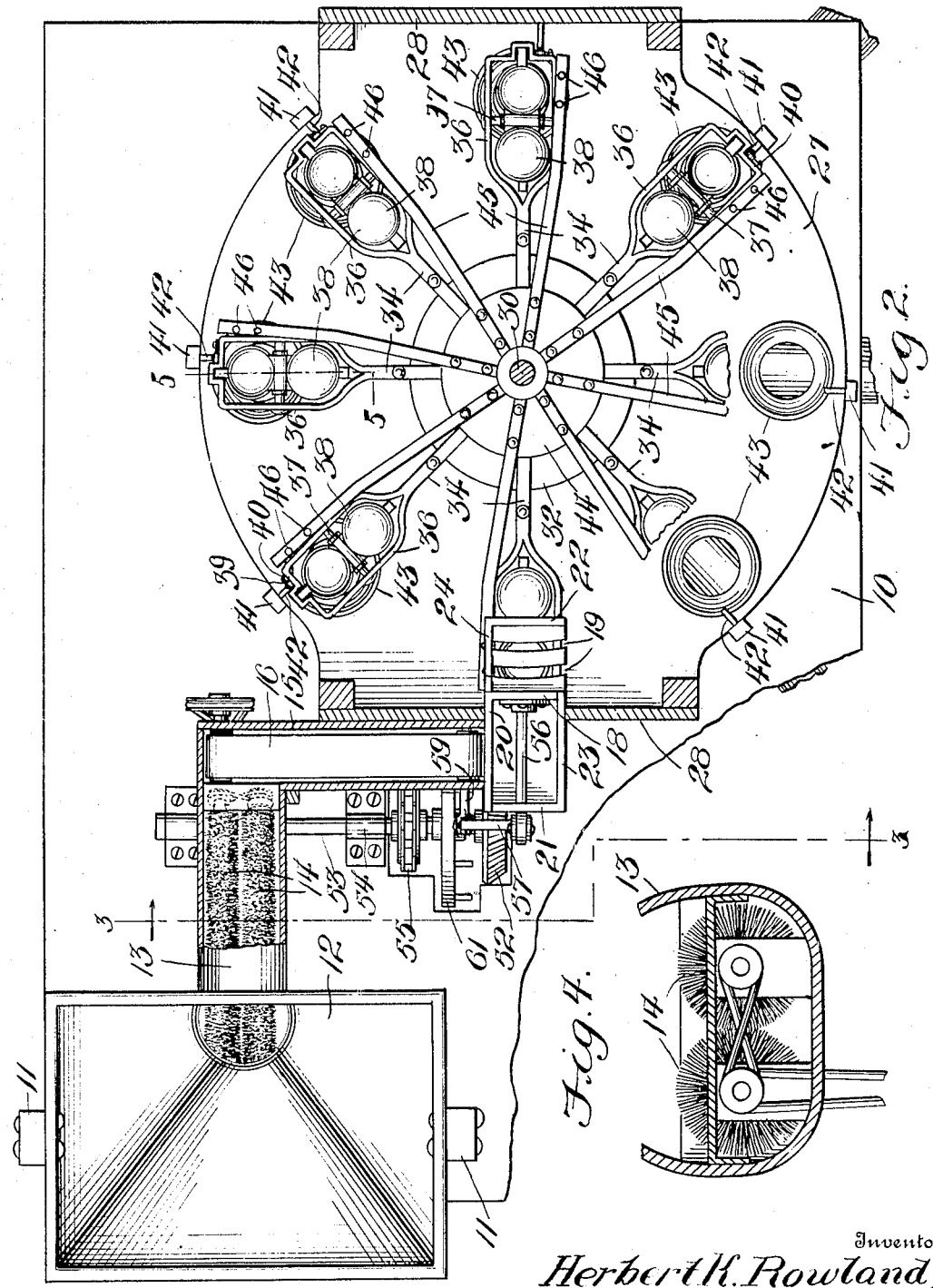

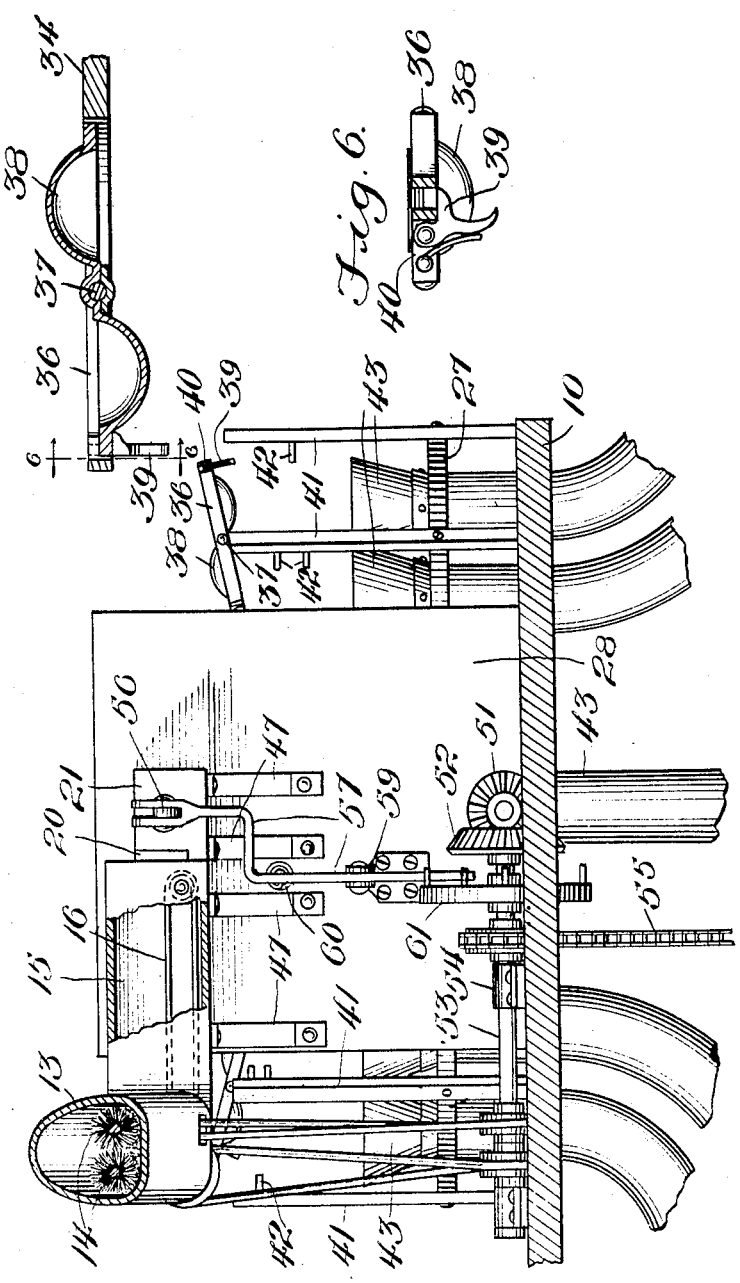

HERBERT K. ROWLAND, OF TOPPENISH, WASHINGTON, ASSIGNOR OF ONE-HALF TO LARS H. LARSEN, OF ALFALFA, WASHINGTON.

APPARATUS FOR ASSORTING OR SIZING FRUIT.

No. 925,950.           Specification of Letters Patent.           Patented June 22, 1909.

Application filed September 23, 1908. Serial No. 454,380.

*To all whom it may concern:*

Be it known that I, HERBERT K. ROWLAND, a citizen of the United States, residing at Toppenish, in the county of Yakima and State of Washington, have invented new and useful Improvements in Apparatus for Assorting or Sizing Fruit, of which the following is a specification.

This invention relates to apparatus for assorting or sizing fruit, and more particularly one in which the weight of the fruit operates to assort the same, according to its size.

The object of the present invention is to provide an improved apparatus of this kind which is simple in structure, and rapid and highly efficient in operation.

A further object of the invention is to provide means for cleaning the fruit before it is assorted.

The invention also has for its object to provide an improved mechanism for feeding the fruit to the assorting mechanism, and also various novel features of construction to be fully described hereinafter and claimed.

In the accompanying drawings, Figure 1 is an elevation of the invention, partly in section. Fig. 2 is a horizontal section on the line 2—2 of Fig. 1. Fig. 3 is a cross section on the line 3—3 of Fig. 2. Fig. 4 is a sectional detail showing an end view of the brushes hereinafter referred to. Fig. 5 is an enlarged sectional view on the line 5—5 of Fig. 2. Fig. 6 is a section on the line 6—6 of Fig. 5.

Referring more particularly to the drawings, 10 denotes the supporting platform of the apparatus. Adjacent one end of the platform are standards 11 which support a hopper or other suitable receptacle 12 to hold the fruit to be assorted. The hopper discharges into a chute 13 in which are mounted lengthwise a pair of rotary brushes 14 for cleaning the fruit as it passes over the same. At the bottom of the chute, and extending at right angles from one side thereof, is a trough 15 in which a belt 16 travels. This belt discharges on a feed-table 17 from which the fruit is taken to the assorting mechanism to be presently described. On the feed-table works a plunger 18 for pushing the fruit singly toward the discharge end thereof which is slotted as indicated at 19. The plunger carries a rearwardly-extending guard-plate 20 which works along the edge of the table in front of, or across the discharge end of the belt 16 to prevent the fruit from getting behind the plunger. At the ends of the table are guard-boards 21 and 22, respectively. From the board 21 guard board 23 also extends along the edge of the table up to the slotted portion thereof, and from the board 22 extends a guard board 24 along the edge of the table opposite the side from which the fruit is discharged, and said guard board 24 has slots 25 which communicate with the slots 19. The object of the guard-boards is to prevent the fruit from rolling off the table accidentally.

On the platform 10 is mounted the supporting frame of the assorting mechanism. Said frame comprises top and bottom plates 26 and 27, respectively, and end plates 28. In suitable bearings 29 on the top and bottom plates is mounted a vertical shaft 30. On this shaft are made fast spaced disks 31 and 32, respectively, the former being formed on its under side with ears 33 to which are pivoted radially-extending distributing arms 34. To the disk 32 are fastened springs 35 which are also connected to the arms 34, and serve to normally hold the same in elevated position, the upward movement of said arms being limited by their engagement with the edge of the disk 31.

The extremities of the arms 34 are in the shape of a fork, between the branches 36 of each of which is mounted on a cross-pin 37, a pair of tilting cups 38 to receive the fruit. The cups are oppositely presented and connected so that when they tilt or flop over to discharge the fruit from one of said cups, the other cup will come into operative position. The cups are held stationary to support the fruit, by a spring latch 39 pivoted to a cross-bar 40 connecting the extremities of the branches 36.

On the platform 10 are mounted a series of posts 41 carrying projecting pins 42 which are adapted to engage the tails of the latches 39 to trip the same. In front of the posts 41 are located suitable receptacles 43 to receive the assorted fruit. The pins 42 are located at different elevations so that the receptacle into which the fruit is to be dropped will depend on which of the pins trip the latch, and this is governed by the extent of the downward swing of the arms 34 by the weight of the fruit carried in the cups. Thus, the highest pin trips the latch of the cup carrying the lightest fruit, and permits the same to drop into the receptacle 43 adjacent the post which carries said pin. The latch of the cup carrying the heaviest fruit will be tripped by the lowest pin and dropped into the corresponding receptacle 43. The other pins will be placed at various elevations so as to properly assort the intermediate sizes of fruit.

Above the disk 31 the shaft 30 carries a disk 44 to which are secured radially-extending arms 45 carrying at their extremities upstanding pins 46 which are for the purpose of sliding the fruit into the cups 38. The slots 19 and 25 are in the path of the pins 46 which, when the arms 45 rotate, pass through said slots and engage the fruit on the table 17 and slide the same off said table into the cups 38. There are as many arms 45 as there are distributing arms 34, and the pins 46 are located slightly behind the cups so that they will engage the fruit at the proper time to slide the same into the cups, as stated.

The feed-table 17 is supported by a bracket 47 secured to one of the end plates 28, and said table extends through an opening in said plate so that its slotted portion or discharge end may be in proper position with respect to the assorting mechanism.

On the lower end of the shaft 30 is a bevel gear 48 which meshes with a bevel pinion 49 on one end of a shaft 50, on the other end of which is another bevel pinion 51 which meshes with a bevel gear 52 on a drive-shaft 53 mounted in suitable bearings 54 on the platform 10. Motion is imparted to the shaft 53 by means of a sprocket chain 55, or other means, from a suitable source of power, and through the gearing just described the motion of said shaft is transmitted to the shaft 30, whereby the arms 34 and 45 will be rotated to operate the assorting mechanism. The brushes 14 and the belt 16 are driven by a suitable system of belt, rope, or other gearing from the drive-shaft 53.

To the stem 56 of the plunger 18 is connected a lever 57 which is fulcrumed at 58 to a bracket 59 secured to one of the plates 28. To this plate is also made fast one end of a spring 60, the other end of which is connected to the lever on one side of its fulcrum. The end of the lever on the other side of the fulcrum is in the path of the pins of a tappet-wheel 61 mounted on the shaft 53. The tappet-wheel, through the lever 57, retracts the plunger and when the pins of the tappet-wheel clear the end of the lever and release the same, the spring 60 swings the lever in a direction to advance the plunger, whereby the fruit on the feed-table is pushed singly over on the slotted or discharge end thereof.

In the operation of the apparatus, the fruit is fed to the chute 13 from the hopper 12 and is thoroughly cleaned as it passes down the same over the rotating brushes 14. At the bottom of the chute, the fruit is taken up by the belt 16 and carried to the feed-table 17 and pushed singly across the same to the discharge end thereof by the plunger 18. The pins 46, upon passing through the slots 19 and 25, push the fruit into the cups 38. The weight of the fruit lowers the arms 34 against the tension of the springs 35 a distance proportional to such weight, and when the latches 39 strike the pins 42 as already described, the cups are released and they flop over and drop the fruit into the proper receptacle 43, after which the springs 35 elevate the arms 34 to their normal position, and the cups are then ready for re-filling when they again pass under the feed-table.

The apparatus herein described is rapid and highly efficient in operation, and it effectually serves the purpose for which it is designed. By adjusting the position of the pins 42, the fruit can be sorted into various sizes according to the demands or requirements of the market.

The preferred form of my invention is shown and described herein, but it is to be understood that various changes, not involving a departure from the inventive idea, may be made, and I do not wish to be limited except as indicated by the appended claims.

Having thus described the invention, what I claim is:—

1. An assorting apparatus comprising a series of rotating distributing-arms having a yielding movement, the extent of which is governed by the weight of the article, releasable article supporting means carried by the arms, and means located at different elevations for releasing said supporting means to discharge the article.

2. An assorting apparatus comprising a series of rotating distributing-arms having a yielding movement, the extent of which is governed by the weight of the article, tilting cups mounted on the arms to carry the article, latches for holding the cups in carrying position, and trips for releasing the latches, said trips being located at different elevations.

3. An assorting apparatus comprising a rotatable vertical shaft, spaced disks thereon, radially-extending distributing arms pivoted to one of the disks, springs carried by the other disk and engageable with the distributing arms, releasable article supporting means carried by the arms, and means located at different elevations for releasing said supporting means to discharge the article.

4. In an assorting apparatus, a distributing arm, a pair of oppositely-presented and alternately-reversible cups carried by said arms, means for feeding the article to the cups, and means for discharging the same.

5. In an assorting apparatus, a slotted feed-table, an article carrier traveling beneath the same, and a pusher traveling with the carrier and passing through the slots in the table for sliding the article off the same to the carrier in combination with a revoluble article carrier traveling beneath the table and including a pair of oppositely presented and alternately reversible cups, means to cause such cups to reverse and revoluble means movable with the article carrier and having pins to move through the slots.

In testimony whereof I affix my signature in presence of two witnesses.

HERBERT K. ROWLAND.

Witnesses:
  G. G. LEE,
  ROSCOE MADDOX.